United States Patent
Qi et al.

(10) Patent No.: US 10,551,490 B2
(45) Date of Patent: Feb. 4, 2020

(54) SECURITY INSPECTION SYSTEM AND METHOD USING THE THREE-DIMENSIONAL HOLOGRAPHIC IMAGING TECHNOLOGY

(71) Applicants: SHENZHEN CCT THZ TECHNOLOGY CO., LTD., Shenzhen (CN); CHINA COMMUNICATION TECHNOLOGY CO., LTD., Shenzhen (CN)

(72) Inventors: Chunchao Qi, Shenzhen (CN); Chao Sun, Shenzhen (CN); Guangsheng Wu, Shenzhen (CN); Shukai Zhao, Shenzhen (CN); Qing Ding, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/034,377

(22) Filed: Jul. 13, 2018

(65) Prior Publication Data
US 2018/0321373 A1 Nov. 8, 2018

Related U.S. Application Data

(63) Continuation of application No. PCT/CN2016/093079, filed on Aug. 3, 2016.

(30) Foreign Application Priority Data

Apr. 25, 2016 (CN) .......................... 2016 1 0262003

(51) Int. Cl.
*G01S 13/88* (2006.01)
*G01S 13/90* (2006.01)
(Continued)

(52) U.S. Cl.
CPC .............. *G01S 13/887* (2013.01); *G01S 7/03* (2013.01); *G01S 13/90* (2013.01); *H01Q 21/00* (2013.01)

(58) Field of Classification Search
CPC ...... G01S 13/88; G01S 13/887; G01S 13/888; G01S 13/90
See application file for complete search history.

(56) References Cited

U.S. PATENT DOCUMENTS 3,713,156 A * 1/1973 Pothier ..................... G01S 7/04
342/22
5,859,609 A * 1/1999 Sheen ...................... A61B 5/05
342/179
(Continued)

FOREIGN PATENT DOCUMENTS

CN 102426361 A 4/2012
CN 202453498 U 9/2012
(Continued)

*Primary Examiner* — Peter M Bythrow (57) ABSTRACT

The present disclosure relates to a security inspection system and method using the three-dimensional holographic imaging technology. The system comprises: a body frame; a millimeter-wave transceiving module, disposed on the body frame; and at least two millimeter-wave switch antenna arrays, connected with the millimeter-wave transceiving module; the number of the millimeter-wave switch antenna arrays being the same as that of the scan areas; a scan driving device, configured to drive the at least two millimeter-wave switch antenna arrays to rotate along the same direction; a control device, configured to control the scan driving device to generate a rotation angle signal; and a parallel-image processing module, configured to synthesize a three-dimensional holographic image of an under-test object according to echo signals collected by the millimeter-wave transceiving module and spatial position information of the echo (Continued)

signals. The present disclosure simplifies the system structure and improves the imaging resolution.

10 Claims, 5 Drawing Sheets

(51) Int. Cl.
*G01S 7/03* (2006.01)
*H01Q 21/00* (2006.01)

(56) References Cited

U.S. PATENT DOCUMENTS

| | | | | |
|---|---|---|---|---|
| 6,965,340 B1* | 11/2005 | Baharav | ............... | G01S 13/89 |
| | | | | 342/22 |
| 7,212,153 B2* | 5/2007 | Rowe | ............... | G01S 13/887 |
| | | | | 342/179 |
| 7,253,766 B2* | 8/2007 | Foote | ............... | G01S 13/003 |
| | | | | 342/179 |
| 7,365,672 B2* | 4/2008 | Keller | ............... | G01N 21/3581 |
| | | | | 342/179 |
| 7,405,692 B2* | 7/2008 | McMakin | ............... | G01S 7/20 |
| | | | | 342/22 |
| 7,548,185 B2* | 6/2009 | Sheen | ............... | G01S 13/89 |
| | | | | 342/22 |
| 7,804,442 B2* | 9/2010 | Ammar | ............... | G01S 17/89 |
| | | | | 342/179 |
| 9,791,553 B2* | 10/2017 | Rose | ............... | G01S 7/41 |
| 2004/0140924 A1* | 7/2004 | Keller | ............... | G01N 21/3581 |
| | | | | 342/22 |
| 2005/0093733 A1* | 5/2005 | Lovberg | ............... | G01V 8/005 |
| | | | | 342/22 |
| 2005/0232459 A1* | 10/2005 | Rowe | ............... | G01S 13/86 |
| | | | | 382/100 |
| 2006/0017605 A1* | 1/2006 | Lovberg | ............... | G01K 7/226 |
| | | | | 342/22 |
| 2007/0263907 A1* | 11/2007 | McMakin | ............... | G01S 13/887 |
| | | | | 382/115 |
| 2009/0073023 A1* | 3/2009 | Ammar | ............... | G01S 13/887 |
| | | | | 342/22 |
| 2010/0013920 A1* | 1/2010 | Nikulin | ............... | G01S 7/295 |
| | | | | 348/143 |
| 2010/0265117 A1* | 10/2010 | Weiss | ............... | G01S 13/003 |
| | | | | 342/22 |
| 2011/0043403 A1* | 2/2011 | Loffler | ............... | G01S 7/02 |
| | | | | 342/25 A |
| 2011/0050480 A1* | 3/2011 | Kroning | ............... | G01S 7/025 |
| | | | | 342/27 |
| 2011/0102597 A1* | 5/2011 | Daly | ............... | G01S 13/887 |
| | | | | 348/162 |
| 2015/0048964 A1* | 2/2015 | Chen | ............... | G01S 13/426 |
| | | | | 342/22 |
| 2015/0253422 A1* | 9/2015 | Morton | ............... | G01S 13/887 |
| | | | | 324/642 |
| 2016/0216371 A1* | 7/2016 | Ahmed | ............... | G01V 8/005 |
| 2016/0259047 A1* | 9/2016 | Blech | ............... | G01V 8/005 |
| 2016/0291148 A1* | 10/2016 | Ellenbogen | ............... | G01V 8/005 |

FOREIGN PATENT DOCUMENTS

| | | |
|---|---|---|
| CN | 105510912 A | 4/2016 |
| CN | 105756269 A | 7/2016 |
| CN | 205608180 U | 9/2016 |
| JP | 2008145230 A | 6/2008 |

\* cited by examiner

SECURITY INSPECTION SYSTEM AND METHOD USING THE THREE-DIMENSIONAL HOLOGRAPHIC IMAGING TECHNOLOGY

CROSS-REFERENCE TO RELATED APPLICATIONS

The present application is a continuation-application of International (PCT) Patent Application No. PCT/CN2016/093079 filed Aug. 3, 2016, which claims foreign priority of Chinese Patent Application No. 201610262003.1, filed on Apr. 25, 2016 in the State Intellectual Property Office of China, the entire contents of which are hereby incorporated by reference.

FIELD OF THE INVENTION

The present disclosure generally relates to the technical field of millimeter-wave imaging, and more particularly, relates to a security inspection system and method using the three-dimensional (3D) holographic imaging technology.

BACKGROUND OF THE INVENTION

Frequency of a millimeter-wave ranges from 30 GHz to 300 GHz (the wavelength thereof ranges from 1 mm to 10 mm). In the electromagnetic spectrum, the location of the millimeter-wave frequency is between infrared and microwave. A millimeter-wave imaging system mainly has the following features: being sensitive to the shape and structure of an object, having a strong capability of distinguishing between a metal object and the background environment; having a high image resolution, thereby improving the capability of recognizing and detecting the object; the millimeter-wave being less vulnerable to hostile natural environment and being applicable in hostile environment with smoke and mist or the like as compared to infrared laser; having a small system volume and a light weight, and as compared to a microwave circuit, the millimeter-wave circuit size being much smaller, thereby making the millimeter-wave system easier to be integrated. Based on the aforesaid features, the millimeter-wave imaging technology has found wide application especially in fields of nondestructive testing and security inspection.

The millimeter-wave imaging mechanism is mainly divided into millimeter-wave active imaging and millimeter-wave passive imaging. The passive millimeter-wave imaging system has a simpler structure and a lower cost for imaging, but the imaging time is long and the imaging resolution is lower. In the active millimeter-wave imaging system, active synthetic aperture imaging and active holographic imaging are the main imaging mechanisms. The method of millimeter-wave holographic imaging is derived from the method of optical hologram, and it operates in the following way by using relevant principles of electromagnetic waves: first, a transmitter will transmit a millimeter-wave signal of a high stability, then a receiver receives echo signals reflected back from the object and processes the echo signals with a highly related reference signal to extract amplitude and phase information of the echo signals, thereby obtaining a three-dimensional image of the object in the scene by the method of data and image processing. The millimeter-wave image obtained by millimeter-wave active holographic imaging has a high image resolution and a short imaging time, and thus millimeter-wave active holographic imaging is particularly applicable to the human-body security inspection system.

Figure 1:
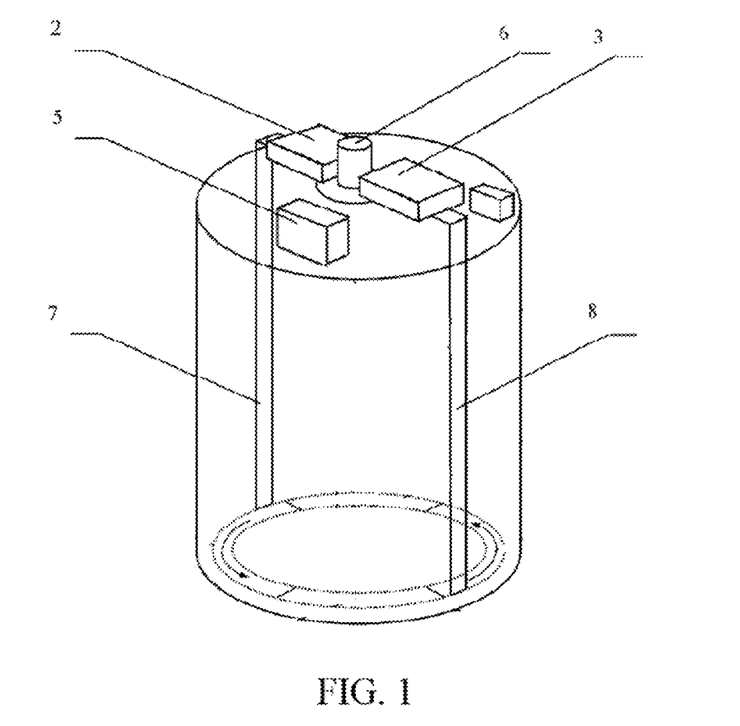
FIG. 1 is a schematic structural view of a conventional security inspection system using the three-dimensional holographic imaging technology.

In order to reduce scan time, the human-body security inspection system of millimeter-wave active three-dimensional holographic imaging current available is provided with two scan units, and as shown in FIG. 1, comprises: a first scan unit consisting of a first millimeter-wave transceiver 2 and a first millimeter-wave switch antenna array 7; and a second scan unit consisting of a second millimeter-wave transceiver 3 and a second millimeter-wave switch antenna array 8. The structure is specifically disposed as: two symmetrical rotating arms are disposed on a body frame of the human-body security inspection system to fix the two scan units respectively. The imaging method based on this human-body security inspection system comprises: when a to-be-tested person enters into the center of a to-be-scanned area, driving the two scan units to rotate by rotating a scan driving device 6, thereby performing rotary-scanning operation for the to-be-test person. An image processing device 5 obtains a three-dimensional holographic image of the to-be-tested person by synthesizing data from the two scan units.

As can be seen from the above description, the human-body security inspection system of millimeter-wave active three-dimensional holographic imaging current available has a complicated structure and the implementation cost is higher: and moreover, the two scan units perform scanning and information transceiving operation independently, so the image obtained has a low resolution.

SUMMARY OF THE INVENTION

Accordingly, an embodiment of the present disclosure provides a security inspection system and method using the three-dimensional holographic imaging technology which have a simple system structure, and an image obtained thereby has a high resolution.

One aspect of the present disclosure provides a security inspection system using the three-dimensional holographic imaging technology. The security inspection system comprises a body frame having a to-be-scanned area and at least two scan areas formed therein, and further comprises: a millimeter-wave transceiving module, at least two millimeter-wave switch antenna arrays, a scan driving device and a parallel-image processing module. The number of the millimeter-wave switch antenna arrays is the same as the number of the scan areas.

The millimeter-wave transceiving module is disposed on the body frame, and the millimeter-wave transceiving module is connected with each of the millimeter-wave switch antenna arrays.

The scan driving device is configured to drive the at least two millimeter-wave switch antenna arrays to rotate along a same direction, so that each of the millimeter-wave switch antenna arrays performs rotary-scanning operation for an under-test object in the to-be-scanned area within a corresponding scan area respectively.

The parallel-image processing module is configured to synthesize a three-dimensional holographic image of the under-test object according to echo signals collected by the millimeter-wave transceiving module and spatial position information of the echo signals.

Another aspect of the present disclosure provides a security inspection method using the three-dimensional holographic imaging technology that is based on the security inspection system using the three-dimensional holographic imaging technology, and the security inspection method comprises:

triggering a scan instruction after detecting that an under-test object has entered into a to-be-scanned area;

receiving the scan instruction, and controlling a scan driving device to generate rotation angle information according to a preset rotation control signal, thereby driving at least two millimeter-wave switch antenna arrays to rotate along a same direction so that each of the millimeter-wave switch antenna arrays performs rotary-scanning operation for the under-test object in the to-be-scanned area in a Single Input Multiple Output (SIMO) mode within a corresponding scan area respectively;

transmitting a millimeter-wave signal by a millimeter-wave transceiving module, dividing the millimeter-wave signal into at least two paths of signals, transmitting the at least two paths of signals to the corresponding millimeter-wave switch antenna arrays respectively to be transmitted; collecting echo signals reflected back from the under-test object that are received by each of the at least two millimeter-wave switch antenna arrays as well as spatial position information of the echo signals;

obtaining a three-dimensional holographic image of the under-test object according to the echo signals and the spatial position information of the echo signals that are collected.

The aforesaid technical solution of the present disclosure only needs one millimeter-wave transceiving module and reduces the number of system parts, so the overall structure is simpler and the system cost is reduced. On the other hand, with the MISO mode of the millimeter-wave switch antenna arrays, the areas being scanned are denser, the echo signals are synthesized for more times, so the resolution of the three-dimensional holographic image obtained is higher and the image is clearer, as compared to the security inspection system currently available.

DETAILED DESCRIPTION OF THE INVENTION

To make objectives, technical solutions and advantages of the present disclosure clearer and easier to be understood, the present disclosure will be further described in detail hereinafter with reference to attached drawings and embodiments. It shall be appreciated that, specific embodiments described herein are only used for explaining the present disclosure and not intended to limit the present disclosure.

Figure 2:
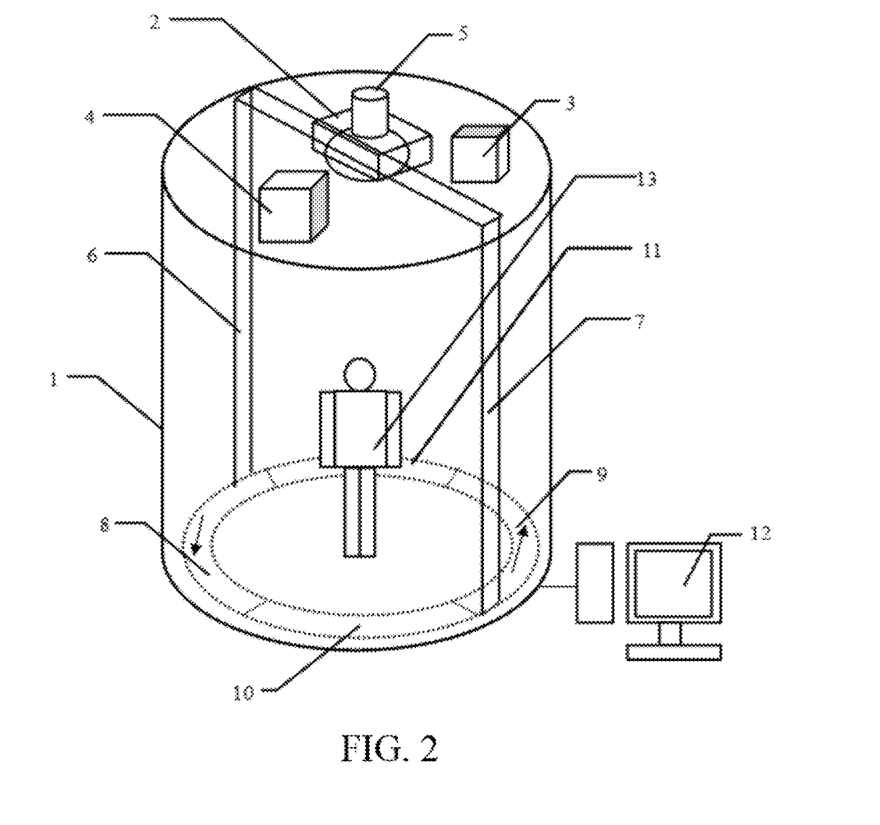
FIG. 2 is a schematic structural view of a security inspection system using the three-dimensional holographic imaging technology according to an embodiment.

FIG. 2 is a schematic structural view of a security inspection system using the three-dimensional holographic imaging technology according to an embodiment. The security inspection system using the three-dimensional holographic imaging technology according to this embodiment comprises a body frame 1 having a to-be-scanned area 10 and at least two scan areas formed therein, and further comprises: a millimeter-wave transceiving module 2, at least two millimeter-wave switch antenna arrays, a scan driving device 5 and a parallel-image processing module 4. The number of the millimeter-wave switch antenna arrays is the same as the number of the scan areas. The millimeter-wave transceiving module 2 is connected with each of the millimeter-wave switch antenna arrays. The scan driving device 5 is disposed on the body frame 1 and configured to drive the at least two millimeter-wave switch antenna arrays to rotate along a same direction, so that each of the millimeter-wave switch antenna array performs rotary-scanning operation for an under-test object in the to-be-scanned area 10 within a corresponding scan area respectively. The parallel-image processing module 4 is configured to synthesize a three-dimensional holographic image of the under-test object according to echo signals collected by the millimeter-wave transceiving module 2 and spatial position information of the echo signals.

Figure 3:
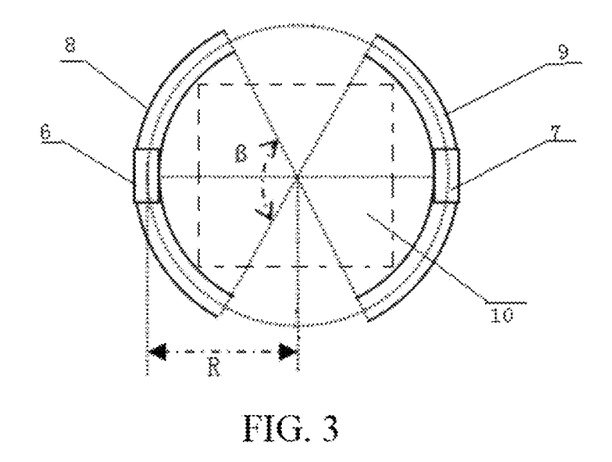
FIG. 3 is a schematic structural view of a scan area of two millimeter-wave switch antenna arrays according to an embodiment.

As a optionally implementation, in the embodiment of the present disclosure, the trajectories of the rotary-scanning operation of all the millimeter-wave switch antenna arrays may form an enclosed circular trajectory. Correspondingly, as shown in FIG. 2 and FIG. 3, the body frame 1 of this embodiment may be disposed as a cylindrical body frame, and the cylindrical body frame has a first scan area 8 and a second scan area 9 formed therein. A radius of the cross section of the body frame 1 is R. The first scan area 8 and the second scan area 9 are distributed symmetrically, and scanning angles of both the two scan areas are P. Correspondingly, a first millimeter-wave switch antenna array 6 and a second millimeter-wave switch antenna array 7 included in the security inspection system using the three-dimensional holographic imaging technology of this embodiment are respectively connected with the millimeter-wave transceiving module 2. Moreover, the security inspection system using the three-dimensional holographic imaging technology further comprises a control device 3 configured to control the scan driving device 5 to generate a rotation angle signal. Under the control of the control device 3, the scan driving device 5 drives the first millimeter-wave switch antenna array 6 and the second millimeter-wave switch antenna array 7 to rotate along the same direction so as to perform the rotary-scanning operation for the under-test object in the to-be-scanned area within the first scan area 8 and the second scan area 9 respectively. It shall be appreciated that, the body frame 1 may also be disposed to be other shapes, e.g., a rhombus shape or the like.

In this embodiment, the aforesaid body frame 1 further comprises an inlet 10 and an outlet 12, and the whole security inspection system using the three-dimensional holographic imaging technology may be controlled by a control computing device 12 to scan an under-test object 13 entering into the to-be-scanned area 10, thereby discovering foreign matters hidden below clothes through the three-dimensional image.

As a optionally implementation, the security inspection system using the three-dimensional holographic imaging technology according to the embodiment of the present disclosure further comprises a control device 3 disposed on the body frame 1, and the control device 3 is communicatively connected with the corresponding control computing device 12 so as to control the scan driving device 5 to generate a rotation angle signal according to a scan instruction transmitted by the control computing device 12.

Figure 4:
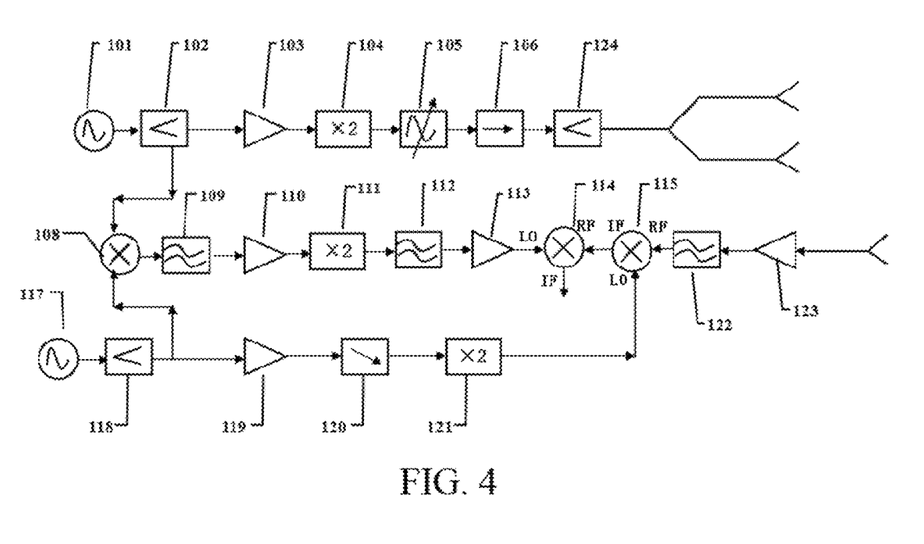
FIG. 4 is a schematic view illustrating the internal structure of a millimeter-wave transceiving module according to an embodiment.

As a optionally implementation, referring to FIG. 4, in the case where two-millimeter-wave switch antenna arrays are included, the millimeter-wave transceiving module 2 in this embodiment of the present disclosure may be implemented as comprising two signal sources (i.e., a first signal source 101 and a second signal source 117), two primary-power dividers (i.e., a first primary-power divider 102 and a second primary-power divider 118), one secondary-power divider 124, two primary-frequency mixers (a first primary-frequency mixer 108 and a second primary-frequency mixer 115) and a secondary-frequency mixer 114, in order to realize the control of the signal transceiving of the two millimeter-wave switch antenna arrays by the millimeter-wave transceiving module 2. An output signal of the first signal source 101 is divided into a $1^{st}$ path signal and a $2^{nd}$ path signal after passing through one primary-power divider 102; and the $1^{st}$ path signal is divided into two paths of transmitting signals respectively which enter into two corresponding transmitting antennas after passing through the secondary-power divider 124.

An output signal of the second signal source 117 is divided into a $3^{rd}$ path signal and a $4^{th}$ path signal after passing through another primary-power divider 118. The $3^{rd}$ path signal and the $2^{nd}$ path signal respectively enter into two input terminals of the first primary-frequency mixer 108, and the $4^{th}$ path signal and a received signal from a corresponding receiving antenna respectively enter into an LO terminal and an RF terminal of the second primary-frequency mixer 115.

An output signal of the first primary-frequency mixer 108 and an output signal of the second primary-frequency mixer 115 respectively enter into an LO terminal and an RF terminal of a secondary-frequency mixer 114, and an output signal of the secondary-frequency mixer 114 is transmitted to a signal output terminal of the millimeter-wave transceiving module 2.

Further speaking, the millimeter-wave transceiving module 2 further comprises a first amplification branch, a second amplification branch, a third amplification branch and a fourth amplification branch. The $1^{st}$ path signal enters into an input terminal of the secondary-power divider 124 after being amplified by the first amplification branch. The $4^{th}$ path signal and a received signal from a corresponding receiving antenna enter into the LO terminal and the RF terminal of the second primary-frequency mixer 115 after being amplified by the second amplification branch and the third amplification brand respectively; and the output signal of the first primary-frequency mixer 108 enters into the LO terminal of the secondary-frequency mixer 114 after being amplified by the fourth amplification branch.

Optionally, as shown in FIG. 4, a specific implementation of the millimeter-wave transceiving module 2 is illustrated below as comprising: a first signal source 101, a second signal source 117, a first frequency mixer 114, a second frequency mixer 115, a third frequency mixer 108, a first frequency multiplier 104, a second frequency multiplier 111, a third frequency multiplier 121, a first power amplifier 103, a second power amplifier 110, a third power amplifier 119, a fourth power amplifier 113, a low-noise amplifier 123, a first power divider 102, a second power divider 118, a first wave filter 109, a second wave filter 112, a third wave filter 122, a first attenuator 105 and a second attenuator 120, and connection relationships among these elements are as follows:

An output terminal of the first signal source 101 connects to an input terminal of the first power divider 102. An output terminal of the first power divider 102 connects to an input terminal of the first power amplifier 103. An output terminal of the first power amplifier 103 connects to an input terminal of the first frequency multiplier 104. An output terminal of the first frequency multiplier 104 connects to an input terminal of the first attenuator 105, and an output signal of the first attenuator 105 is divided into transmitting antennas of two transmitting arrays and radiated into the space after passing through the third power divider 124.

An output terminal of the second signal source 117 connects to an input terminal of the second power divider 118. An output terminal of the second power divider 118 connects to an input terminal of the third power amplifier 119. An output terminal of the third power amplifier 119 connects to an input terminal of the second attenuator 120. An output terminal of the second attenuator 120 connects to an input terminal of the third frequency multiplier 121. An output terminal of the third frequency multiplier 121 connects to the LO terminal of the second frequency mixer 115. The RF terminal of the second frequency mixer 115 receives an echo signal reflected in the space from the receiving antenna, and an IF terminal of the second frequency mixer 115 outputs a signal that is down converted for the first time and carries information of the object to the RF terminal of the first frequency mixer 114.

Another output terminal of the first power divider 102 and another output terminal of the second power divider 118 connect to two input terminals of the third frequency mixer 108 respectively. An output terminal of the third frequency mixer 108 connects to an input terminal of the first wave filter 109. An output terminal of the first wave filter 109 connects to an input terminal of the second power amplifier 110. An output terminal of the second power amplifier 110 connects to an input terminal of the second frequency multiplier 111. An output terminal of the second frequency multiplier 111 connects to an input terminal of the second wave filter 112. An output terminal of the second wave filter 112 connects to an input terminal of the fourth power amplifier 113. An output terminal of the fourth power amplifier 113 connects to the LO terminal of the first frequency mixer 114, and the IF terminal of the first frequency mixer 114 outputs a signal that is down converted for the second time and caries information of the object to a signal output terminal of the millimeter-wave transceiving module 2.

Optionally, the first signal source 101 is a frequency modulation (FM) signal source having an operating frequency at a frequency band from 16.1 GHz to 20.1 GHz, and the second signal source 117 is a signal source having an operating frequency at a frequency band from 16 GHz to 20 GHz. An output terminal of the first attenuator 105 connects to an input terminal of the third power divider 124 via an isolator 106, and an output signal of the first attenuator 105 is divided into two millimeter-wave switch antenna arrays and radiated into the space after passing through the isolator 106 and the third power divider 124 in sequence.

Optionally, the first frequency multiplier 104, the second frequency multiplier 111, and the third frequency multiplier 121 are all double frequency multipliers.

For the aforesaid structure of the millimeter-wave transceiving module, the first power divider 102 is a three-port element, and one port thereof inputs a signal to the first power amplifier 103 so that the power of this link reaches a safe input power range of the first frequency multiplier 104. The input frequency of this link ranges from 32.2 GHz to 40.2 GHz after passing through the first frequency multiplier 104, then the output power is adjusted by an adjustable attenuator, and the output power is finally divided into transmitting antennas of two millimeter-wave switch antenna arrays and radiated into the space after passing through the third power divider 124. An isolator needs to be added between the antenna and the first attenuator 105 so as to ensure that the signal transmitted by the transmitting antenna will not be disturbed by the received signal. The second frequency mixer 115 is a three-port element, and the three ports are respectively RF, LO and IF. The RF terminal receives echo signals received from the receiving antenna. The LO terminal inputs a second signal source signal of which the frequency is doubled, and the signal is down converted and then input to the first frequency mixer 114. This signal carries information of the under-test object, and is input to the RF terminal of the first frequency mixer 114 to be further processed. The first frequency mixer 114 is also a three-port element, and the three ports are respectively RF, LO and IF. The RF terminal of the first frequency mixer 114 inputs a signal output from the second frequency mixer 115 that is down converted for the first time and carries information of the under-test object. The LO terminal of the first frequency mixer 114 inputs a continuous wave signal (a millimeter-wave signal) that is output by the second signal source via the second power divider 118, the third frequency mixer 108, the second power amplifier 110 and the second frequency multiplier 111, and the IF terminal of the first frequency mixer 114 outputs a signal that is down converted for the second time and carries information of the under-test object to the parallel-image processing module.

Figure 5:
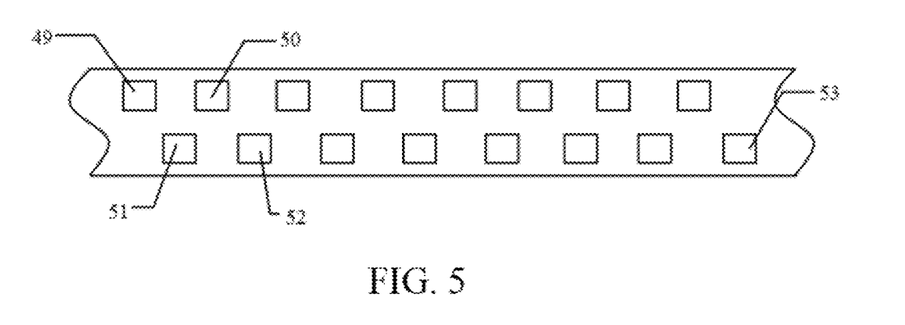
FIG. 5 is a schematic view illustrating the internal structure of the millimeter-wave switch antenna arrays according to an embodiment.

As a optionally implementation, as shown in FIG. 5, in the security inspection system using the three-dimensional holographic imaging technology of this embodiment, the two millimeter-wave switch antenna arrays are disposed symmetrically. Each of the millimeter-wave switch antenna arrays comprises several transmitting antennas and several receiving antennas, and the transmitting antennas and the receiving antennas are arranged into two rows in a staggered manner. Each of the millimeter-wave switch antenna arrays operates in the MISO mode, and each transmitting antenna corresponds to at least two receiving antennas.

Optionally, the number of the transmitting antennas is the same as that of the receiving antennas in each of the millimeter-wave switch antenna arrays, and the number of both the transmitting antennas and the receiving antennas ranges from 128 to 192. A transmitting antenna array formed by all the transmitting antennas in each of the millimeter-wave switch antenna arrays is configured to radiate a transmitting signal transmitted from the millimeter-wave transceiving module 2 to the space where the under-test object is located. A receiving antenna array formed by all the receiving antennas in each of the millimeter-wave switch antenna arrays is configured to receive echo signals reflected by the under-test object.

Optionally, the transmitting antennas and the receiving antennas are respectively controlled by four single-pole quadruple-throw (SP4T) switches, and when one of the switch is turned on, at least one set of the transmitting antennas and the receiving antennas operate.

It shall be appreciated that, the security inspection system using the three-dimensional holographic imaging technology is specifically illustrated by taking two millimeter-wave switch antenna arrays and two scan areas as an example in the above embodiments of the present disclosure. However, three or four millimeter-wave switch antenna arrays and three or four corresponding scan areas may also be provided based on the similar principle and depending on actual needs, thereby further improving the scanning efficiency and the imaging resolution.

The security inspection system using the three-dimensional holographic imaging technology of the aforesaid embodiment reduces the hardware cost of the system by using a single millimeter-wave transceiving module as compared to the case using two transceiving modules. Meanwhile, the number of the parts is reduced, so the overall structure is simpler.

Figure 6:
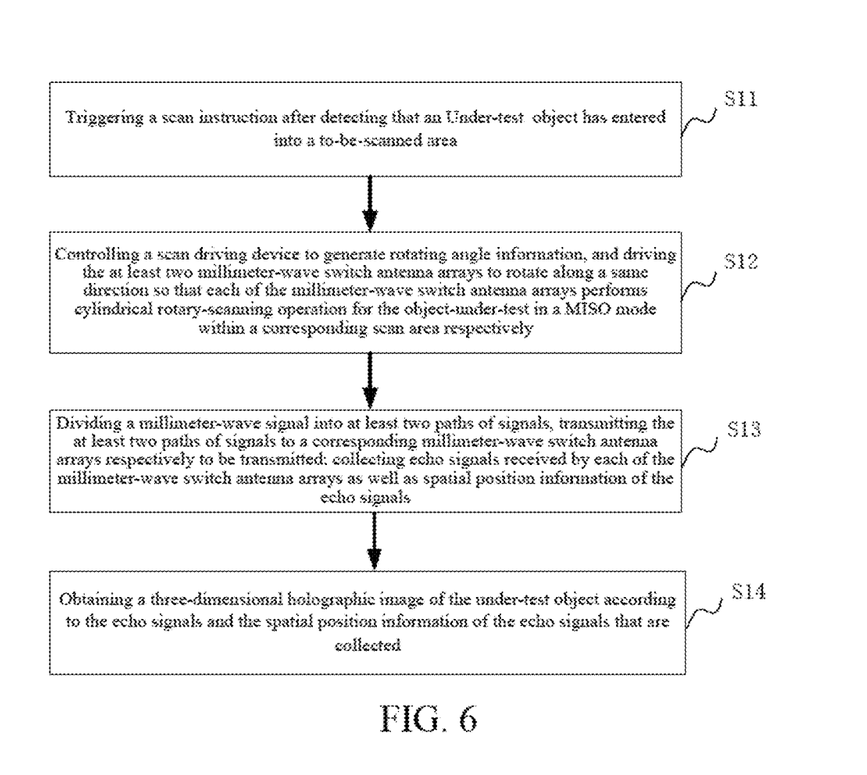
FIG. 6 is a schematic flowchart diagram of a security inspection method using the three-dimensional holographic imaging technology according to an embodiment.

Based on the security inspection system using the three-dimensional holographic imaging technology of the aforesaid embodiments, FIG. 6 is a schematic flowchart diagram of a security inspection method using the three-dimensional holographic imaging technology according to an embodiment. As shown in FIG. 6, the security inspection method using the three-dimensional holographic imaging technology according to this embodiment comprises the following steps:

S11: triggering a scan instruction after detecting that an under-test object has entered into a to-be-scanned area 10.

S12: receiving the scan instruction, and controlling a scan driving device to generate rotation angle information according to a preset rotation control signal, thereby driving at least two millimeter-wave switch antenna arrays to rotate along a same direction so that each of the millimeter-wave switch antenna array performs rotary-scanning operation for the under-test object in the to-be-scanned area in a MISO mode within a corresponding scan area respectively.

Optionally, the control device 3 receives the scan instruction and controls the scan driving device 5 to generate rotation angle information according to a preset rotation control signal, thereby driving the first millimeter-wave switch antenna array 6 and the second millimeter-wave switch antenna array 7 to rotate along a same direction so as to perform rotary-scanning operation for the under-test object in a MISO mode respectively within the first scan area 8 and the second scan area 9.

S13: transmitting a millimeter-wave signal by a millimeter-wave transceiving module, dividing the millimeter-wave signal into at least two paths of signals, transmitting the at least two paths of signals to a corresponding millimeter-wave switch antenna array respectively to be transmitted; collecting echo signals reflected back from the under-test object that are received by each of the at least two millimeter-wave switch antenna arrays as well as spatial position information of the echo signals.

Optionally, the millimeter-wave transceiving module 2 transmits a millimeter-wave signal, and the signal may be divided into two paths of signals of the same power by the power divider and transmitted to transmitting antennas of two millimeter-wave switch antenna arrays to be transmitted. The receiving antennas of the two millimeter-wave switch antenna arrays receive echo signals reflected back from the under-test object, and the echo signals as well as spatial position information of the echo signals are returned back to the millimeter-wave transceiving module 2 together.

S14: obtaining a three-dimensional holographic image of the under-test object according to the echo signals and the spatial position information of the echo signals that are collected.

It shall be appreciated that, the millimeter-wave switch antenna arrays continuously transmit and receive signals at regular time intervals during the rotation, so the order in which the steps S12 and S13 is executed is not limited.

In this embodiment, the millimeter-wave switch antenna arrays is in the MISO mode. A certain transmitting antenna of the millimeter-wave switch antenna arrays transmits a millimeter-wave signal to the space where the under-test object is located at a first time point, records a spatial coverage area of the millimeter-wave signal transmitted at the first time point, and receives an echo signal corresponding to this millimeter-wave signal through a preset first receiving antenna. The transmitting antenna transmits a millimeter-wave signal to the space where the under-test object is located again at a second time point, records a spatial coverage area of the millimeter-wave signal transmitted at the second time point, and receives an echo signal corresponding to this millimeter-wave signal through a preset second receiving antenna. In other words, each transmitting antenna in the millimeter-wave switch antenna arrays of this embodiment continuously transmits millimeter-wave signals at least for two times, and two corresponding different receiving antennas receive the echo signals reflected back respectively.

For example, as shown in FIG. 5, the transmitting antennas and the receiving antennas in the millimeter-wave switch antenna arrays are arranged in a staggered manner. A receiving antenna 49 receives the corresponding echo signal when a transmitting antenna 51 transmits a millimeter-wave signal for the first time, and a receiving antenna 50 receives the corresponding echo signal when the transmitting antenna 51 transmits a millimeter-wave signal in a next transceiving process, and so on. This is the MISO mode of the millimeter-wave switch antenna arrays.

In this embodiment, the spatial coverage area of the millimeter-wave signal that is transmitted by the transmitting antenna at each time is fixed. Thus, as a optionally implementation, the method of synthesizing a three-dimensional holographic image by performing demodulation on the echo signals comprises: calculating an overlapped area of the two spatial coverage areas of the millimeter-wave signals transmitted respectively at the first time point and the second time point; and screening an echo signal corresponding to the overlapped area from the echo signals received by the first receiving antenna and the second receiving antenna; and determining whether the overlapped area calculated has covered the whole under-test object, and if the determination result is yes, then obtaining the three-dimensional holographic image of the under-test object according to the echo signal of the overlapped area.

Figure 7:
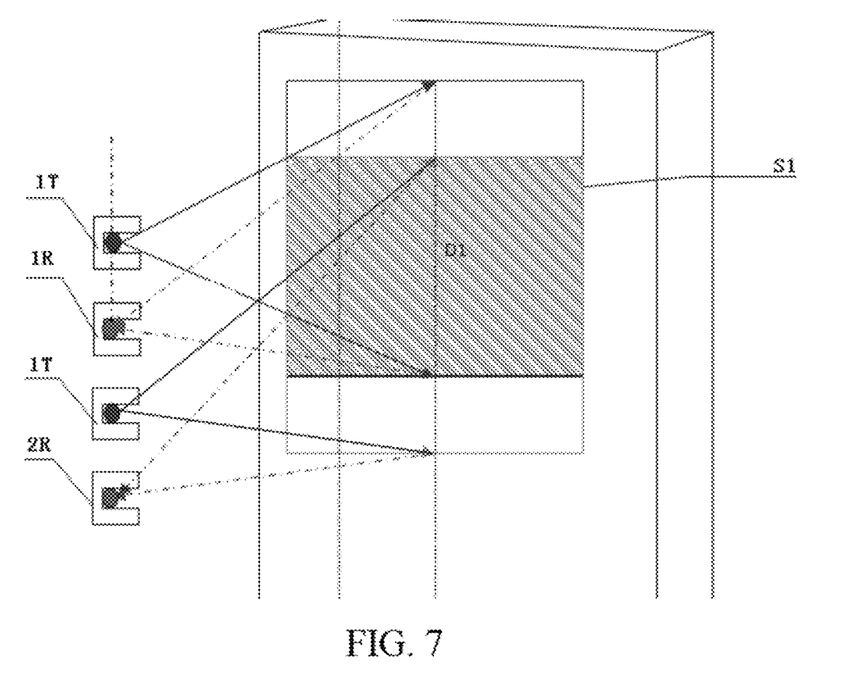
FIG. 7 is a schematic view of a three-dimensional holographic imaging synthetic aperture method under the MISO mode of the antenna arrays according to an embodiment.

Specifically, the collected echo signals are parsed by adopting the synthesized aperture technology in this embodiment so as to obtain the three-dimensional holographic image of the under-test object. As shown in FIG. 7, a transmitting antenna IT transmits a millimeter-wave signal at a certain time point, and the echo signal reflected back is received by a receiving antenna 1R. Because the antenna array is rotating, the spatial coverage area of a millimeter-wave signal transmitted by the transmitting antenna IT at a next time point differs from the spatial coverage area at the last time point, and an overlapped area (a DI area of FIG. 7) exists between the spatial position area of the echo signal received by the receiving antenna 2R and the spatial position area of the echo signal received by the receiving antenna 1R. The echo information of the overlapped area is collected and processed. Because the echo information of the overlapped area DI is received for two times by the receiving antenna 1R and the receiving antenna 2R, the resolution of the image that is obtained based on the echo information of the overlapped area DI will be largely improved. By repeating the transmitting and receiving processes for multiple times until the obtained overlapped area can cover the whole under-test object (a cylindrical area SI of FIG. 7), the resolution of the three-dimensional holographic image of the under-test object that is obtained by the three-dimensional holographic imaging method of this embodiment is largely improved as compared to the Single Input Single Output (SISO) mode of the conventional antenna array.

What shown in FIG. 7 is only a set of transceiving model. It shall be appreciated that, the overlapped area that is obtained by each of the transceiving modules is associated with the wave beam width of the transmitting antenna, the switching time of the switch, and the scanning time interval. The shorter the scanning time interval is or the faster the switch switching is, the larger the overlapped area will be, and the higher the resolution of the resultant three-dimensional holographic image will be.

In the aforesaid embodiments, the description of the embodiments is focused on different parts. Reference may be made to relevant description of other embodiments for a part that is not detailed in a certain embodiment. It shall be appreciated that, terms such as "first", "second", "primary", "secondary" or the like used herein are only used to distinguish objects, and these objects are not limited by the terms.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A security inspection system using the three-dimensional (3D) holographic imaging technology, comprising a body frame (1) having a to-be-scanned area (10) and at least two scan areas formed therein, the security system further comprising: a millimeter-wave transceiving module (2), at least two millimeter-wave switch antenna arrays, a scan driving device (5) and a parallel-image processing module (4);

the number of the millimeter-wave switch antenna arrays being the same as the number of the scan areas; each of the millimeter-wave switch antenna arrays being connected to the millimeter-wave transceiving module (2) respectively;

the scan driving device (5) being disposed on the body frame (1) and configured to drive the at least two millimeter-wave switch antenna arrays to rotate along a same direction, so that each of the millimeter-wave switch antenna array performs a rotary-scanning operation for an under-test object in the to-be-scanned area (10) within a corresponding scan area respectively;

the parallel-image processing module (4) being configured to synthesize a three-dimensional (3D) holographic image of the under-test object according to echo signals collected by the millimeter-wave transceiving module (2) and spatial position information of the echo signals;

wherein each of the millimeter-wave switch antenna arrays comprises several transmitting antennas and several receiving antennas which are arranged into two rows in a staggered manner;

wherein each transmitting antennas is located on a line segment bisector of two adjacent receiving antennas wherein each transmitting antennas corresponds to at least two receiving antennas.

2. The security inspection system of three-dimensional holographic imaging of claim 1, wherein the at least two scan areas comprises a first scan area (8) and a second scan area (9); the millimeter-wave switch antenna arrays comprises a first millimeter-wave switch antenna array (6) and a second millimeter-wave switch antenna array (7);

the scan driving device (5) drives the first millimeter-wave switch antenna array (6) and the second millimeter-wave switch antenna array (7) to rotate along the same direction, so that the first millimeter-wave switch antenna array (6) and the second millimeter-wave switch antenna array (7) perform the rotary-scanning operation for the under-test object in the to-be-scanned area (10) within the first scan area (8) and the second scan area (9) respectively.

3. The security inspection system of three-dimensional holographic imaging of claim 2, wherein the millimeter-wave transceiving module (2) comprises: two signal sources, two primary-power dividers, one secondary-power divider, two primary-frequency mixers, and one secondary-frequency mixer; wherein, an output signal of a first signal source (101) is divided into a $1^{st}$ path signal and a $2^{nd}$ path signal after passing through a primary-power divider (102); the $1^{st}$ path signal is divided into two paths of transmitting signals respectively which enter into two corresponding transmitting antennas after passing through a secondary-power divider (124);

an output signal of a second signal source (117) is divided into a $3^{rd}$ path signal and a $4^{th}$ path signal after passing through another primary-power divider (118); the $3^{rd}$ path signal and the $2^{nd}$ path signal respectively enter into two input terminals of a first primary-frequency mixer (108), and the $4^{th}$ path signal and a received signal from a corresponding receiving antenna respectively enter into an LO terminal and an RF terminal of a second primary-frequency mixer (115);

an output signal of the first primary-frequency mixer (108) and an output signal of the second primary-frequency mixer (115) respectively enter into an LO terminal and an RF terminal of a secondary-frequency mixer (114), and an output signal of the secondary-frequency mixer (114) is transmitted to a signal output terminal of the millimeter-wave transceiving module (2).

4. The security inspection system of three-dimensional holographic imaging of claim 3, the millimeter-wave transceiving module (2) further comprises: a first amplification branch, a second amplification branch, a third amplification branch and a fourth amplification branch;

the $1^{st}$ path signal enters into an input terminal of the secondary-power divider (124) being amplified by the first amplification branch;

the $4^{th}$ path signal and the received signal from the corresponding receiving antenna enter into the L( )terminal and the RF terminal of the second primary-frequency mixer (115) after being amplified by the second amplification branch and the third amplification brand respectively;

the output signal of the first primary-frequency mixer (108)enter into the LO terminal of the secondary-frequency mixer (114) after being amplified by the fourth amplification branch.

5. The security inspection system of three-dimensional holographic imaging of claim 4, wherein the first amplification branch comprises a first power amplifier (103), a first frequency multiplier (104) and a first attenuator (105) that are connected in sequence;

the second amplification branch comprises a third power amplifier (119), a second attenuator (120) and a third frequency multiplier (121) that are connected in sequence;

the third amplification branch comprises a low-noise amplifier (123) and a third wave filter (122) that is connected in sequence; and the fourth amplification branch comprises a first wave filter (109), a second power amplifier (110), a second frequency multiplier (111), a second wave filter (112) and a fourth power amplifier (113) that are connected in sequence.

6. The security inspection system of three-dimensional holographic imaging of claim 5, wherein the first amplification branch further comprises an isolator (106), an output terminal of the first attenuator (105) is connected to the input terminal of the third power divider (124) via the isolator (106).

7. The security inspection system of three-dimensional holographic imaging of claim 5, wherein the first signal source (101) is a frequency modulation (FM) signal source having an operating frequency at a frequency band from 16.1 GHz to 20.1 GHz, and the second signal source (117) is a signal source having an operating frequency at a frequency band from 16 GHz to 20 GHz; and the first frequency multiplier (104), the second frequency multiplier (111), and the third frequency multiplier (121) are all double frequency multipliers.

8. The security inspection system of three-dimensional holographic imaging of claim 1, the millimeter-wave switch antenna arrays are MISO (Multiple Input Single Output) switch antenna arrays.

9. A security inspection method using the three-dimensional (3D) holographic imaging technology, based on the security inspection system using the three-dimensional holographic imaging technology of claim 1, the security inspection method comprising:

triggering a scan instruction after detecting that an under-test object has entered into a to-be-scanned area;

receiving the scan instruction, and controlling a scan driving device to generate rotation angle information according to a preset rotation control signal, thereby driving at least two millimeter-wave switch antenna arrays to rotate along a same direction so that each of the millimeter-wave switch antenna array performs rotary-scanning operation for the under-test object in the to-be-scanned area in a MISO mode within a corresponding scan area respectively;

transmitting a millimeter-wave signal by a millimeter-wave transceiving module, dividing the millimeter-wave signal into at least two paths of signals, transmitting the at least two paths of signals to a corresponding millimeter-wave switch antenna arrays respectively to be transmitted; collecting echo signals reflected back from the under-test object that are received by each of the at least two millimeter-wave switch antenna arrays as well as spatial position information of the echo signals; and obtaining a three-dimensional holographic image of the under-test object according to the echo signals and the spatial position information of the echo signals that are collected.

10. The security inspection method of three-dimensional holographic imaging of claim 9, wherein the security inspection method further comprises:

in the MISO mode of the millimeter-wave switch antenna arrays, transmitting a millimeter-wave signal to the under-test object at a first time point, recording a spatial coverage area of the millimeter-wave signal transmitted at the first time point by a first transmitting antenna of the millimeter-wave switch antenna arrays, and receiving an echo signal corresponding to this millimeter-wave signal through a preset first receiving antenna;

transmitting a millimeter-wave signal to the under-test object again at a second time point, recording a spatial coverage area of the millimeter-wave signal transmitted at the second time point by the first transmitting antenna, and receiving an echo signal corresponding to this millimeter-wave signal through a preset second receiving antenna;

and the step of obtaining a three-dimensional holographic image of the under-test object according to the echo signals and the spatial position information corresponding to the echo signals that are collected comprises:

calculating an overlapped area of the two spatial coverage areas of the millimeter-wave signals transmitted at the two time points; and screening an echo signal corresponding to the overlapped area from the echo signals received by the first receiving antenna and the second receiving antenna; and determining whether the overlapped area calculated has covered the whole under-test object, and if the determination result is yes, then obtaining the three-dimensional holographic image of the under-test object according to the echo signal of the overlapped area.

* * * * *